United States Patent Office 3,422,184
Patented Jan. 14, 1969

3,422,184
CHEWABLE PRODUCT FOR CLEANING THE TEETH
Michael Ira Goldman, Somerset, and Alexander Wayne Bouchal, Westfield, N.J., assignors to Colgate-Palmolive Company, New York, N.Y., a corporation of Delaware
No Drawing. Filed Oct. 22, 1965, Ser. No. 502,576
U.S. Cl. 424—48  3 Claims
Int. Cl. A61k 9/00; A61k 5/00

ABSTRACT OF THE DISCLOSURE

Chewable product for cleaning the teeth containing gelatin, gum acacia and glycerine. The product is a unitary chewable mass of cohesive, resilient, edible material which is soluble in saliva, which is non-adherent to the teeth and which gives a rubbery resistance during chewing. It slowly dissolves and breaks into small particles under the influence of saliva and chewing.

---

This invention relates to a chewable product for use in cleaning the teeth.

In accordance with one aspect of this invention there is provided a unitary mass of cohesive, resilient, edible material which is soluble in saliva and is substantially free of fermentable carbohydrates. When the mass is bitten between the molars during chewing, it becomes deformed and thus comes into contact with many of the tooth surfaces, even between the teeth, without breaking up into fragments. It is not adherent to the tooth surfaces and comes away freely from the teeth during chewing, to be redeformed by tooth pressure the next time the jaws are brought together. The size of each unitary mass is such that in initial chewing the teeth encounter a relatively thick mass of the material which has a rubbery, yielding resistance to the closing movement of the jaws; the unitary mass yields and its outer surface becomes deformed without significant cutting of its outer surface by the cusps of the teeth. A great deal of the deformation of the material on biting is elastic; that is, the mass is indented by the cusps of the teeth but the indentation disappears to a large extent after each bite owing to the elasticity or resilience of the material. As chewing proceeds, the outer portions of the unitary mass dissolve away gradually in the saliva, its thickness decreases and its surface becomes less resistant to cutting, so that the unitary mass tends eventually to dissolve entirely or to break up into small fragments which can be swallowed as such, chewed or sucked. This fragmentation does not occur, however, until after the mass has been chewed vigorously for more than a half minute, generally more than a minute.

Advantageously, the weight of the unitary mass is in the range of about 1 to 10 grams, preferably about 3 to 5 grams. In the preferred products, the unitary mass has a chewing thickness in the range of about ⅛ inch to ¾ inch, more preferably about ⅜ to ⅝ inch. In a preferred form, the mass is compact and not extended in any particular direction; for example, its shape may be like that of a cube, a sphere, or a right cylinder (e.g. having a ratio of height to diameter of about 1:1 to 2:1), although the use of other less regular shapes is within the scope of the invention. Also, the unitary masses need not be dispensed to the user in entirely discrete form; for example, a rod of the material of the desired diameter may be weakened at spaced points along its length, as by cutting partially through the rod at regular intervals, so that individual, unitary masses can be torn easily off the end of the rod by the user.

The unitary mass also includes a sialagogue to stimulate the flow of saliva, which helps to remove food particles from the teeth. For this purpose, any of the well known substantially non-fermentable sweetening agents and flavoring agents, including breath freshening agents, may be employed.

The unitary masses of this invention have particular utility for cleaning and teeth and freshening the mouth after meals in situations where tooth brushing is impractical or impossible. It has been found that the chewing of the unitary masses of this invention results in extensive removal of trapped food particles, and greatly reduces the level of fermentable carbohydrate material (which is known to contribute to caries formation) in the mouth. The composition, being completely edible, leaves no solid residue. The mouth is cleaned and freshened quickly and easily.

A particularly suitable composition for forming the unitary masses of this invention comprises a protein such as gelatin, a liquid polyhydric alcohol such as glycerine, and a vegetable gum, such as gum acacia. Best results have been obtained by using a gelatin having a high Bloom number (a well known measure of the penetrability of a standard set solution of the gelatin in water); Bloom numbers above about 150, advantageously at least 190, e.g. above 230, preferably in the range of about 265 to 285, are preferred. In the preferred compositions there is also present a small amount of water, and the gelatin and gum acacia are present in approximately equal proportions (e.g. in a ratio within the range of about 1.2:1 to 1:1.2). The proportions of the glycerine and water may be varied in accordance with the resiliency desired; in the preferred compositions the amount of glycerine is on the order of about twice the amount of gelatin (e.g. about 2.2 times the amount of gelatin) while the amount of water is approximately equal to the amount of gelatin (e.g. about 0.8 or 0.9 times the amount of gelatin). In general, the proportions of the ingredients will be within the following ranges: gelatin 5–40% (preferably 15–25%); gum acacia 5–40% (preferably 15–25%); glycerine 5–55% (preferably 35–45%); water 5–40% (preferably 10–20%) total water, from all components.

In the absence of the gum, the gelatin-glycerine compositions tend to have little cohesiveness and to break up readily into many small particles on chewing.

The preferred compositions also contain an insoluble finely divided dental polishing agent. Preferably, the dental polishing agent is an abrasive material having an average particle size below about 10 microns. A particularly suitable polishing agent is finely divided insoluble sodium metaphosphate (e.g. having an average particle size of about 2 to 10 microns). Other polishing agents to assist in removal of film from the teeth are aluminas, chalks, calcium phosphates, aluminum silicates and zirconium silicate. The proportion of polishing agent may be, for example, up to about 20%, e.g. in the range of about 2 to 20%, based on the weight of the total mixture. It is found that the presence of the finely divided polishing agent acts as a reinforcing filler resulting in an increase in the resistance to penetration of the material.

Other ingredients which are advantageously incorporated into the composition are small amounts of non-fermentable sweetening agents such as sodium cyclamate, calcium cyclamate, saccharine, or combinations of sweetening agents; preservatives for the gelatin, such as sodium benzoate; germicidal or anti-bacterial agents such as quaternary ammonium compounds, e.g. benzethonium chloride, (di-isobutylphenoxyethoxyethyl dimethyl benzyl ammonium chloride), cetyl pyridinium chloride, lauryl dimethyl benzyl ammonium chloride, or other non-toxic germicidal agents, such as hexachlorophene. Preferably, the composition includes a flavoring agent as well as a coloring agent; thus, there may be employed various synthetic flavors, e.g. essential oils which provide fruit flavors, e.g. grape, lemon, lime, or orange, mint flavors or spice flavors (e.g. cinammon flavor) all of whose compositions are well known in the art. To help solubilize the germicide and color and avoid any tendency for these components to precipitate, it is sometimes desirable to add a dispersing agent such as polyoxyethylene sorbitan monooleate (e.g. Tween 80).

In one useful method for the preparation of the composition, the gelatin, gum and finely divided polishing agent are dispersed in the glycerine at room temperature. At this stage, the mixture is smooth and paste-like, containing fine solid dispersed particles of the gelatin and gum. The other ingredients are dissolved in the water and the water and glycerine mixtures are blended to form a very fluid mixture which is then heated, preferably to a temperature in the range of about 50–90° C. (e.g. 74° C.), whereupon the gelatin dissolves and the mass thickens greatly. The amount of gum acacia is generally such that complete solution does not take place in the presence of the other ingredients. The flavoring agent is then added to the molten mixture, which is thereafter shaped and cooled, as by pouring into molds of suitable size. It is advantageous to carry out the entire mixing operation under vacuum so as to produce a product substantially free of gas bubbles. We have found that the presence of dispersed air decreases the cohesiveness of the resulting unitary masses and also makes the molten material more resistant to flow during the shaping operation. The use of 24–29 inches of vacuum throughout the process has given excellent results.

The best properties of the material are obtained at predetermined water contents. To avoid altering the water content, it is advantageous to pack the unitary masses in suitable sealed containers. The unitary masses may be wrapped individually in moisture-resistant barrier materials such as aluminum foil or saran film.

The following examples are given to illustrate this invention further:

Example 1

A composition was produced, using the technique described above, by mixing the following ingredients: glycerine, 39.20%; gelatin (Type A, i.e. acid type gelatin; Bloom 277; viscosity 50.5 millipoises, determined on a standard 12.5% aqueous solution at 60° C., as specified by National Association of Glue Manufacturers) 22.41%; gum acacia (gum arabic) 20.98%; insoluble sodium metaphosphate (of average particle size 4.8±0.5 micron) 4.00%; added distilled water 10.99%; 1% solution in water of FD&C Red #2, 0.90%; 1% solution in water of FD&C Red #4, 0.10%; "Hyamine 1622" (benzethonium chloride) 0.05%; sodium benzoate 0.01%; sodium cyclamate 1.12%; flavor (double mint: e.g. peppermint plus spearmint) 0.24%.

The composition was formed into cylindrical masses 11/16 inch in diameter and ½ inch high having rounded bases.

Example 2

A composition was produced, using the technique described above, from the following ingredients: glycerine 37.03%; gelatin (as in Example 1) 18.77%; gum acacia 17.58%; insoluble sodium metaphosphate (as in Example 1) 12.55%; added distilled water 10.09%; sodium cyclamate 1.12%; citric acid monohydrate, which augments the flavor 1.00%; sodium citrate dihydrate 1.5%; sodium benzoate 0.01%; synthetic lime flavor 0.15%; 0.25% solution in water of FD&C Blue #1, 0.08%; 1% solution in water of FD&C Yellow #5, 0.12%. The composition was molded into the same shapes as in Example 1.

Example 3

A composition was produced, using the technique described above, from the following ingredients: glycerine 39.62% (including 0.27% of water based on the total composition); gelatin (as in Example 1) 19.49% (including 1.95% of water based on the total composition); gum acacia 18.25% (including 2.55% of water based on the total composition); polishing agent (as in Example 1) 10.00%; sodium benzoate 0.01%; sodium cyclamate 1.21%; citric acid monohydrate 1.00%; sodium citrate dihydrate 1.50%; plus water and color solution. The total amount of water, as determined by analysis of the finished composition, was 15.00%. The composition was shaped into cylinders ½ inch in diameter and about ¾ inch long.

The preferred compositions are homogeneous and strongly cohesive but do not have substantial tack. Thus, when cut or torn apart and pressed together again (at 25° C.) they do not adhere strongly. Their adhesion is even less when their surfaces are wet by saliva or water; such wetting makes their surfaces become slick or slimy. However, if the surfaces are moistened and then permitted to dry partialy, they become tacky. Also, at very low temperatures (e.g. −40° F.) the masses have been found to tend to fuse together when brought into contact. Their melting points are usually in the neighborhood of about 110–120° F., when melted on a hot stage the material does not tend to flow readily but is very sticky and strings out when it is touched with an instrument and the instrument is pulled away. The masses become softer as the ambient temperature is raised, e.g. to 100° F. Their specific gravity is usually in the neighborhood of 1.3.

One indication of the physical properties of the material is its resilience. This may be measured, for example, of an Instron tester which exerts tension on a specimen at a predetermined rate, then releases the tension and records the results, automatically plotting a graph of elongation (as abscissa) vs. tension (as ordinate). Two curves are recorded, one representing the behavior of the material under tension and the other its recovery towards its original dimensions (a so-called "hysteresis loop" being thus produced). The area under the first curve represents the work required to stretch the specimen the predetermined distance and the area under the second curve represents the work performed by the specimen in recovering. Dividing the second area by the first gives a "resilience index." In one series of tests, a cylinder of the material of ½ inch diameter (and ¾ inch long) was pierced diametrically by two parallel 2 inch standard steel finishing nails spaced ¼ inch apart; the nails were then attached, respectively, to the two pulling arms of the Instron tester. The arms were then moved apart 0.12 inch to stretch the specimen by that distance and then returned to their original position. Both movements were effected at a rate of 0.2 inch per minute. In typical specimens of materials of our invention, the resilience index, so determined, was well over 0.5, e.g. above 0.7, for instance in the range of 0.74 to 0.77. The force necessary to extend the specimen the 0.12 inch distance was generally over 300 grams, e.g. 350–410 grams. The measurements were made at room temperature. It was also found that the specimens recovered their original length during the test, without any substantial permanent set.

Another measure of the physical properties of the material is its penetrability. This may be determined on a standard Precision penetrometer using a 150 gram weight on the pentration needle and allowing the weighted needle to rest on the surface of the material for five seconds. The values of penetrability so determined will vary depending on the type of needle and the shape of the specimen. Using a standard four penny finishing nail as the needle and applying it to the flat upper surface of a cylindrical unitary mass having a diameter of 11/16 inch and a height of ½ inch and having a rounded base, penetration values below 6 mm., e.g. about 3½ to 5 mm., were obtained.

Although the present invention has been described with reference to particular embodiments and examples, it

Having thus described the invention, what is claimed is:

1. A chewable, resilient, cohesive material for cleaning the teeth consisting essentially of 10–20% of water, about 15–25% by weight of gelatin of Bloom number above about 150, gum acacia and glycerine; there being present about equal amounts by weight of gelatin and gum acacia and glycerine being present in amount about twice the weight of gelatin, a sialagogue and about 2–20% by weight of an insoluble dental polishing agent.

2. A chewable material for cleaning the teeth as set forth in claim 1 wherein said unitary mass weighs about 3 to 5 grams.

3. A chewable material for cleaning the teeth as set forth in claim 1 wherein said unitary mass has a thickness of about ⅛ to ¾ inch.

References Cited

UNITED STATES PATENTS

| | | | |
|---|---|---|---|
| 1,445,351 | 2/1923 | Pfanstiehl | 167—93 |
| 2,025,655 | 12/1935 | Faunce | 167—93 |

FOREIGN PATENTS 633,845  12/1949  Great Britain.

OTHER REFERENCES

Dental Abstracts: vol. 6, p. 54, January 1961. Copy in Group 124.

RICHARD L. HUFF, *Primary Examiner.*